B. C. HAMILTON.
SANITARY FLY AND INSECT CATCHER.
APPLICATION FILED NOV. 21, 1911. RENEWED JULY 7, 1913.
1,085,205.
Patented Jan. 27, 1914.
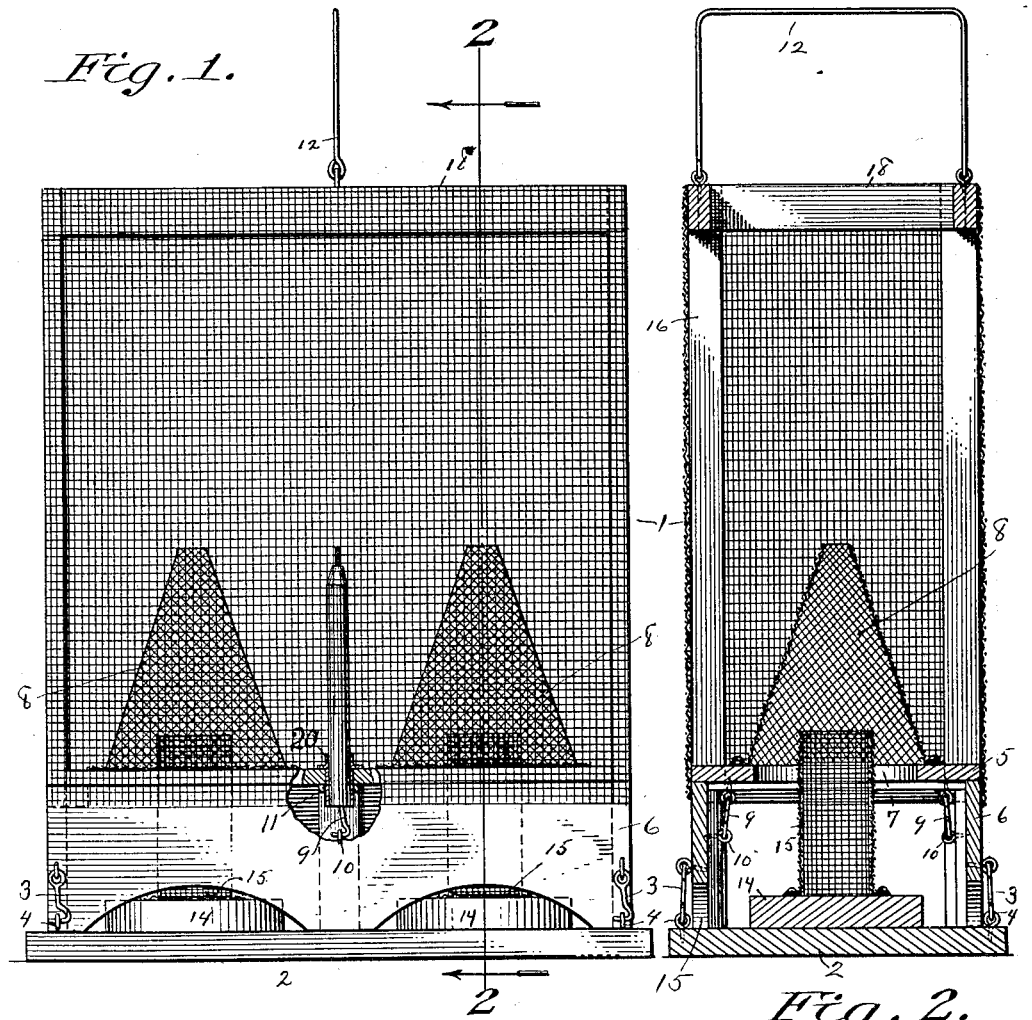
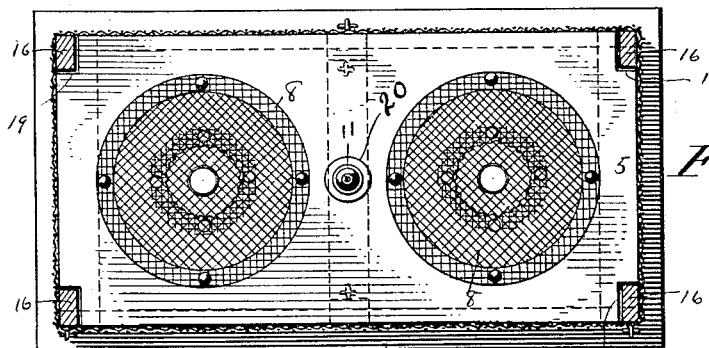
Witnesses:
Ernest J. Ahl
John B. Leavitt
Inventor.
Benj. C. Hamilton

UNITED STATES PATENT OFFICE.

BENJAMIN C. HAMILTON, OF SAN BERNARDINO, CALIFORNIA.

SANITARY FLY AND INSECT CATCHER.

1,085,205. Specification of Letters Patent. Patented Jan. 27, 1914.

Application filed November 21, 1911, Serial No. 661,645. Renewed July 7, 1913. Serial No. 777,783.

*To all whom it may concern:*

Be it known that I, BENJAMIN C. HAMILTON, a citizen of the United States, residing at San Bernardino, in the county of San Bernardino and State of California, have invented certain new and useful Improvements in Sanitary Fly and Insect Catchers; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in insect traps and comprises a simple and efficient apparatus of this nature having various details of construction and combinations and arrangements of parts which will be hereinafter fully described, shown in the accompanying drawings and then specifically defined in the appended claim.

My invention is illustrated in the accompanying drawings, in which:—

Figure 1 is a side elevation of a trap made in accordance with my invention. Fig. 2 is a sectional view on line 2—2 of Fig. 1, and Fig. 3 is a cross sectional view.

Reference now being had to the details of the drawings by numeral, 1 designates the cage which has four corner posts 16 adapted to rest upon the bottom 2. Hooks 3 are fastened to the cage and engage eyes 4 formed in the bottom to hold the cage in place. Said cage has openings upon the sides through which the flies are allowed to enter and a receptacle 14 is mounted upon the bottom and adapted to contain a bait to attract the flies. A partition, designated by numeral 5, rests upon the support 6 and is provided with an aperture 7 through which the cylindrical screen member 15, which rises from the bait receptacle, passes. Conical-shaped members 8 of gauze rest upon said partition and over the opening 7 at the top of the cylindrical gauze member 15 and up which the flies are allowed to pass into the cage above.

The partition has hooks 9 fastened thereto and adapted to engage eyes 10 formed in the support 6 for holding said partition in place and affording means whereby the parts may be disconnected for cleansing the parts and for other purposes. Said partition is provided with a central opening in which a flanged shell 20 is mounted, and 11 is a tube adapted to hold a candle or light for the purpose of attracting bugs or other insects toward the trap. A suitable bail-shaped handle 12 is fastened at the top 18 and affords means for hanging the same if desired or carrying the trap. It will be noted upon reference to Fig. 3 of the drawings that the partition is recessed out at its corners for the reception of the corner pieces 16 and which serve to hold the partition in place.

In operation, the flies attracted by the bait will pass through the openings in the side walls of the cage, thence up through into the cage above and, when used at night, a candle in the tube 11 will serve to attract bugs or other insects into the trap.

What I claim to be new is:—

An insect trap comprising a base having a knock-down casing with openings in the top and sides thereof, a bait receptacle within said casing, a cylindrical open-ended screen member rising from said receptacle and extending through and spaced apart from the marginal edge of the opening in said top, conical-shaped screens fastened to said top and over the opening in the latter, an open-ended shell fitted in an aperture in said top and provided with a flange resting upon the top, a tube mounted in said shell, the corners of said top being recessed, standards rising from the base and passing through said recesses, and a cage supported by said standards, as set forth.

BENJ. C. HAMILTON.

Witnesses:
J. B. LEAVITT,
L. H. ECKHARDT.

Copies of this patent may be obtained for five cents each, by addressing the "Commissioner of Patents, Washington, D. C."